United States Patent
Katsu et al.

(10) Patent No.: US 7,764,161 B2
(45) Date of Patent: Jul. 27, 2010

(54) BARIUM TITANATE-BASED SEMICONDUCTOR PORCELAIN COMPOSITION AND PTC ELEMENT INCLUDING THE SAME

(75) Inventors: Hayato Katsu, Juelich (DE); Kenjirou Mihara, Higashiomo (JP); Hideaki Niimi, Hikone (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/413,254

(22) Filed: Mar. 27, 2009

(65) Prior Publication Data
US 2009/0201121 A1    Aug. 13, 2009

Related U.S. Application Data

(63) Continuation of application No. PCT/JP2007/068051, filed on Sep. 18, 2007.

(30) Foreign Application Priority Data
Sep. 28, 2006   (JP)   ............... 2006-263711

(51) Int. Cl.
   *H01C 7/10*   (2006.01)
(52) U.S. Cl. .................. 338/22 R; 338/223; 252/500; 428/404
(58) Field of Classification Search ............... 338/22 R, 338/23, 24, 320, 223, 224; 252/500, 511–514; 428/404, 325, 328, 331
See application file for complete search history.

(56) References Cited

U.S. PATENT DOCUMENTS

| | | | | |
|---|---|---|---|---|
| 5,414,403 A | * | 5/1995 | Greuter et al. | ............ 338/22 R |
| 5,424,707 A | * | 6/1995 | Ishikawa et al. | ........ 338/22 SD |
| 5,837,164 A | * | 11/1998 | Zhao | ........................... 252/500 |
| 6,218,928 B1 | * | 4/2001 | Okada et al. | .............. 338/22 R |
| 6,542,067 B1 | * | 4/2003 | Kawamoto | ................ 338/22 R |

FOREIGN PATENT DOCUMENTS

| | | |
|---|---|---|
| JP | 56-169301 | 12/1981 |
| JP | 2005-255493 | 9/2005 |
| WO | WO-/2006/118274 | 11/2006 |

OTHER PUBLICATIONS

International Search Report for PCT/JP2007/068051 dated Jun. 11, 2007.

* cited by examiner

*Primary Examiner*—Kyung Lee
(74) *Attorney, Agent, or Firm*—Dickstein Shapiro LLP

(57) ABSTRACT

A barium titanate-based semiconductor ceramic composition and a PTC element that have a high Curie temperature and a low electrical resistivity at room temperature and that exhibit a desired rate of change in resistance are provided. The barium titanate-based semiconductor ceramic composition is a ceramic composition having a perovskite structure containing at least barium and titanium, wherein some of the barium is replaced with an alkali metal element, bismuth, and a rare earth element, and when the content of the titanium is assumed to be 100 parts by mole, a ratio of the content of the alkali metal element to the content of the bismuth plus the content of the rare earth element represented by parts by mole, is 1.00 or more and 1.06 or less. A PTC thermistor includes a ceramic body composed of the barium titanate-based semiconductor ceramic composition having the above feature and electrodes disposed on both side faces of the ceramic body.

20 Claims, 1 Drawing Sheet

US 7,764,161 B2

BARIUM TITANATE-BASED SEMICONDUCTOR PORCELAIN COMPOSITION AND PTC ELEMENT INCLUDING THE SAME

This is a continuation of application Serial No. PCT/JP2007/068051, filed Sep. 18, 2007.

TECHNICAL FIELD

The present invention generally relates to a barium titanate ($BaTiO_3$)-based semiconductor ceramic composition, and in particular, to a barium titanate-based semiconductor ceramic composition used in a PTC element such as a PTC thermistor for overcurrent protection or a PTC heater functioning as a temperature control heater.

BACKGROUND ART

Various types of barium titanate-based semiconductor ceramic compositions containing $BaTiO_3$ as a basic composition are known as materials that exhibit positive temperature coefficient (PTC) characteristics. These barium titanate-based semiconductor ceramic compositions have a Curie temperature of about 125° C. PTC heaters composed of such a composition are used at high temperatures, and thus it is necessary that the Curie temperature of the barium titanate-based semiconductor ceramic composition be higher than 125° C. Consequently, in order to increase the Curie temperature, lead titanate ($PbTiO_3$) is added to $BaTiO_3$, thereby forming a solid-solution composition.

However, $PbTiO_3$ contains lead, which is an environmental impact substance. Accordingly, lead-free barium titanate-based semiconductor ceramic compositions having a high Curie temperature have been proposed.

For example, in order to prevent a decrease in a temperature coefficient of resistance due to replacement with lead (Pb) in a barium titanate-based semiconductor ceramic composition to solve a problem of a degradation of withstand voltage characteristics, Japanese Unexamined Patent Application Publication No. 56-169301 (Patent Document 1) discloses a method of producing a barium titanate-based semiconductor ceramic composition including the steps of adding at least one of niobium (Nb), tantalum (Ta), and a rare earth element to a composition having a composition formula of $Ba_{1-2x}(BiNa)_xTiO_3$ in which some of barium (Ba) of $BaTiO_3$ is replaced with bismuth (Bi)-sodium (Na) and x satisfies the relationship $0<x\leq0.15$, firing the resulting mixture in nitrogen, and performing a heat treatment in an oxidizing atmosphere.

In addition, Japanese Unexamined Patent Application Publication No. 2005-255493 (Patent Document 2) proposes a composition for decreasing an electrical resistivity at room temperature in the barium titanate-based semiconductor ceramic composition disclosed in the Patent Document 1. The $BaTiO_3$-based semiconductor ceramic composition proposed in this patent application is a composition in which some of the Ba is replaced with element A1 (one or more of Na, potassium (K), and lithium (Li)) and element A2 (Bi), and some of the Ba is further replaced with a predetermined amount of element Q (one or more of lanthanum (La), dysprosium (Dy), europium (Eu), and gadolinium (Gd)).

DISCLOSURE OF INVENTION

Problems to be Solved by the Invention

In the barium titanate-based semiconductor ceramic composition proposed in the above patent applications, the Curie temperature is high; 125° C. or higher, and the electrical resistivity at room temperature is decreased by adding a rare earth element, such as La, which is a semiconductor-forming agent. However, it is difficult to sufficiently decrease the electrical resistivity. In addition, it was found that addition of an excessive amount of the semiconductor-forming agent decreases the PTC characteristic of the rate of change in resistance.

Accordingly, an object of the present invention is to provide a barium titanate-based semiconductor ceramic composition and a PTC element that have a high Curie temperature, a low electrical resistivity at room temperature, and a desired rate of change in resistance.

Means for Solving the Problems

A barium titanate-based semiconductor ceramic composition according to the present invention is a barium titanate-based semiconductor ceramic composition having a perovskite structure containing at least barium and titanium, wherein some of the barium is replaced with at least one alkali metal element, bismuth, and a rare earth element, and when the content of the titanium is assumed to be 100 parts by mole, the ratio of the content of the alkali metal element) to the sum of the content of the bismuth plus the content of the rare earth element, which is a relationship between the contents of the alkali metal element, the bismuth, and the rare earth element, in parts by mole, is from 1.00 to 1.06.

By controlling the composition of the above-described barium titanate-based semiconductor ceramic composition of the present invention, the content of the alkali metal element becomes higher than the total content of bismuth and the rare earth element functioning as donor elements. It was found that, consequently, a compound containing the alkali metal element that does not form a solid solution in ceramic crystal grains separates out from inside of the ceramic crystal grains, and a large amount of the compound is present at grain boundaries and grain-boundary triple points of the ceramic crystal grains. This compound containing the alkali metal element wets the surfaces of the ceramic crystal grains in a solid-phase state during sintering process. As a result, a liquid-phase sintering reaction occurs, and thereby the sintering temperature decreases. The decrease in the sintering temperature decreases the amounts of alkali metal element and bismuth volatilized during the sintering process. It was found that, as a result, a barium titanate-based semiconductor ceramic composition having a low electrical resistivity can be obtained, and a barium titanate-based semiconductor ceramic composition having a high Curie temperature and a desired rate of change in resistance can be produced with good reproducibility.

In the barium titanate-based semiconductor ceramic composition of the present invention, the ratio of the content of the alkali metal element to the content of the bismuth, in by parts by mole of the alkali metal element and the bismuth that are present in crystal grain boundaries of the barium titanate-based semiconductor ceramic composition, is from 1.04 to 5.0.

When the alkali metal element and the bismuth are present in the crystal grain boundaries of the barium titanate-based semiconductor ceramic composition within this range of the content ratio, the electrical resistivity at room temperature can be further decreased, and a higher rate of change in resistance can be obtained.

A PTC element according to the present invention includes a ceramic body composed of the barium titanate-based semiconductor ceramic composition having the above feature and an electrode disposed on a surface of the ceramic body.

According to this structure, a PTC element such as a PTC thermistor or PTC heater that is suitable for use at high temperatures and that has a low electrical resistivity at room temperature and a desired rate of change in resistance can be produced with good reproducibility.

ADVANTAGES

According to the present invention, a barium titanate-based semiconductor ceramic composition having a low electrical resistivity can be obtained, and a barium titanate-based semiconductor ceramic composition and a PTC element that have a high Curie temperature, a low electrical resistivity at room temperature, and a desired rate of change in resistance can be produced with good reproducibility.

REFERENCE NUMERALS

Figure 1:
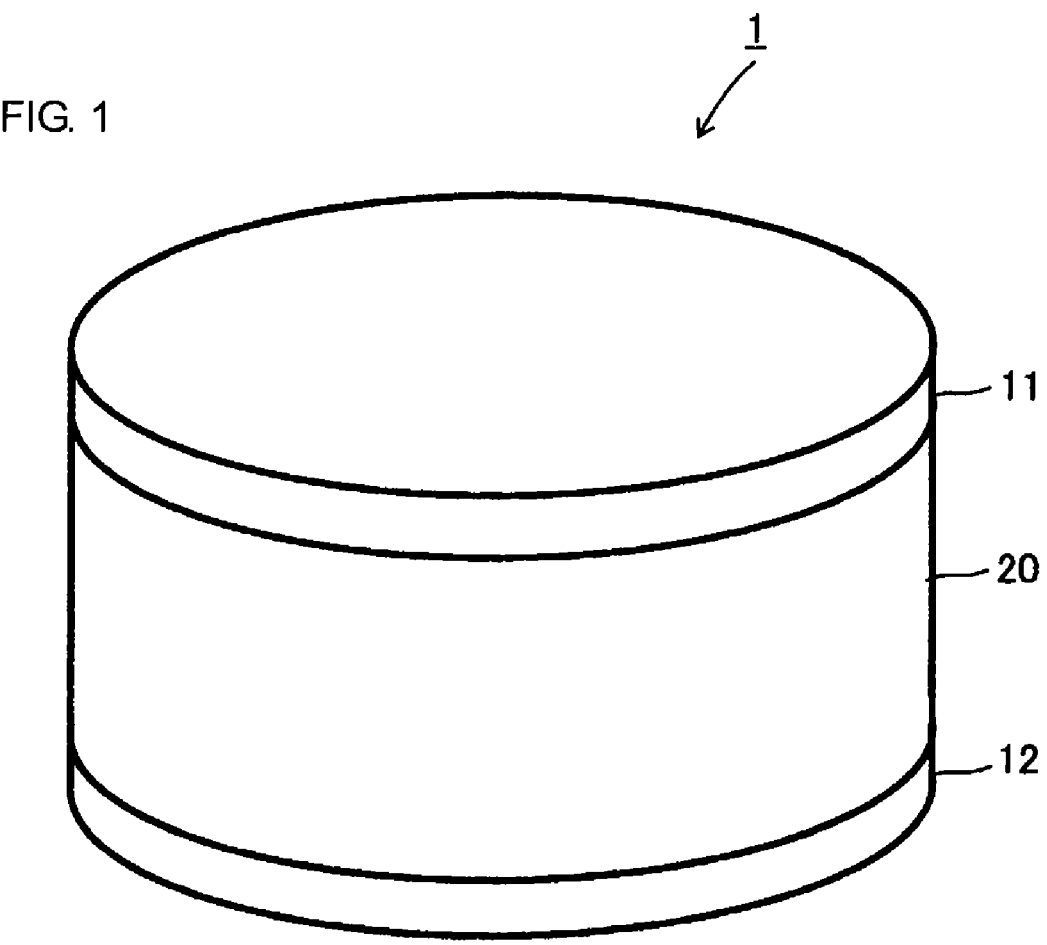
FIG. 1 is a perspective view showing, as an embodiment of the present invention, the schematic structure of a PTC thermistor which is an example of a PTC element formed using a barium titanate-based semiconductor ceramic composition of the present invention.

1: PTC thermistor, 11, 12: electrode, 20: ceramic body

BEST MODE FOR CARRYING OUT THE INVENTION

An embodiment of the present invention will now be described with reference to the drawing.

A composition as a preferred embodiment of a barium titanate-based semiconductor ceramic composition according to the present invention contains a main component represented by a composition formula of $ABO_3$ wherein A contains barium (Ba), an alkali metal element (hereinafter referred to as "AM") (such as sodium (Na), potassium (K), or lithium (Li)), bismuth (Bi), and a rare earth element (hereinafter referred to as "Ln") (such as lanthanum (La), neodymium (Nd), or samarium (Sm)), B contains titanium (Ti), and when the content of the Ti is assumed to be 100 parts by mole, the ratio (content of AM)/{(content of the Bi)+(content of Ln)} (hereinafter referred to as "AM/(Bi+Ln)", which is a relationship between the contents of the elements of AM, Bi, and Ln, represented by parts by mole is 1.00 or more and 1.06 or less.

By controlling the composition to be the above-described barium titanate-based semiconductor ceramic composition, the content of AM becomes higher than the total content of Bi and Ln which function as a donor elements. Consequently, a compound (e.g., $AM_2O$) containing AM that does not form a solid solution in ceramic crystal grains separates from inside of the ceramic crystal grains, and a large amount of the compound is present at grain boundaries and grain-boundary triple points of the ceramic crystal grains. This AM compound wets the surfaces of the ceramic crystal grains in a solid-phase state during sintering. As a result, a liquid-phase sintering reaction occurs, and thereby the sintering temperature decreases. As for the mechanism of this phenomenon, it is assumed without being bound thereby, that this phenomenon occurs because the excess AM decreases the surface energy of the ceramic crystal grains. Accordingly, the sintering producing the barium titanate-based semiconductor ceramic composition of the present invention can be performed at a temperature lower than that in a sintering process of known barium titanate-based semiconductor ceramic compositions. The decrease in the sintering temperature decreases the amounts of AM and Bi volatilized during the sintering process. As a result, a barium titanate-based semiconductor ceramic composition having a low electrical resistivity can be obtained, and a barium titanate-based semiconductor ceramic composition having a high Curie temperature and a desired rate of change in resistance can be produced with good reproducibility.

It is experimentally found that when the compound containing AM is present at grain boundaries and grain-boundary triple points of ceramic crystal grains, the rate of change in resistance of the barium titanate-based semiconductor ceramic composition is improved. It is believed again without being bound thereby, that this is because the AM is functioning as an acceptor and is present along crystal grain boundaries in an amount larger than the amount of Bi functioning as a donor, and thereby, the thickness of a depletion layer near the crystal grain boundaries is increased. Specifically, this can be realized by adjusting the proportion of the contents of AM and Bi that are present at the crystal grain boundaries of the barium titanate-based semiconductor ceramic composition to be $1.04 \leq$ the content of an alkali metal element/the content of bismuth $\leq 5.0$.

FIG. 1 is a perspective view showing, as an embodiment of the present invention, the schematic structure of a PTC thermistor which is an example of a PTC element formed using the barium titanate-based semiconductor ceramic composition.

As shown in FIG. 1, a PTC thermistor 1 includes electrodes 11 and 12 and a semiconductor ceramic body 20 disposed between the electrodes 11 and 12, the semiconductor ceramic body 20 being made of the above-described barium titanate-based semiconductor ceramic composition. The electrodes 11 and 12 made of, for example, nickel (Ni), aluminum (Al), chromium (Cr), or a nickel (Ni)-chromium (Cr) alloy are formed on two surfaces of the ceramic body 20. The shape of the PTC thermistor 1 as a PTC element shown in FIG. 1 is a disc shape or a columnar shape, but the shape may be a rectangular parallelepiped or the like.

An example of a method of producing the PTC thermistor of the present invention will now be described. First, powders of compounds of elements contained in the barium titanate-based semiconductor ceramic composition which is a final target product are prepared so as to have a predetermined composition, a solvent is then added to the resulting mixed powder, and the mixture is ground. The resulting mixture is dried and granulated. The granulated powder is heat-treated to prepare a calcined powder. A binder and other additives are added to the calcined powder, and the resulting mixture is ground and then granulated. A compact is formed using the granulated powder. The prepared compact is degreased, and then fired to form the ceramic body 20. Subsequently, an electrode paste is applied to both main surfaces of the ceramic body 20, and then baked to form the electrodes 11 and 12. Thus, the PTC thermistor of the present invention is formed.

The barium titanate-based semiconductor ceramic composition of the present invention can be produced as described above. In the sintering process of producing the barium titanate-based semiconductor ceramic composition of the present invention, the sintering can be performed at a temperature lower than that in a sintering process of known barium titanate-based semiconductor ceramic compositions. Accordingly, the sintering temperature can be decreased from 1,300° C. to 1,400° C. in the related art to 1,100° C. to 1,250° C., and preferably to about 1,150° C. to 1,200° C.

The sintering atmosphere in the sintering process of producing the barium titanate-based semiconductor ceramic composition of the present invention, may be an air atmosphere or a reducing atmosphere. Note that the above-mentioned sintering temperatures are sintering temperatures in the case where the sintering is performed in an air atmosphere.

In the case where the sintering is performed in an air atmosphere, as for a preferable barium titanate-based semiconductor ceramic composition, when the Ti content is assumed to be 100 parts by mole, the AM content is controlled to be 2.0 parts by mole or more and 10 parts by mole or less, the Bi content is controlled to be 1.8 parts by mole or more and 10 parts by mole or less, the Ln content is controlled to be 0.1 parts by mole or more and 1.0 part by mole or less, and the A site/B site ratio is controlled to be 1.002 or more and 1.008 or less. Thereby, a control can be performed so that a high Curie temperature can be maintained, the electrical resistivity at room temperature can be decreased to a predetermined value or less, and a desired rate of change in resistance can be obtained.

In addition, it was found that when a reducing atmosphere is used as the sintering atmosphere in the sintering process of producing the barium titanate-based semiconductor ceramic composition of the present invention, not only advantages of the present invention can be achieved, but also a rate of change with time can be further reduced when the sintered product is maintained at a high temperature for a long time, and thus reliability is improved. It is assumed, without being bound thereto that this is because when the sintering is performed in a reducing atmosphere, the amount of Na precipitated at crystal grain boundaries is decreased. The sintering is preferably performed at a temperature in the range of about 1,300° C. to 1,400° C. In the case where the sintering is performed in a reducing atmosphere, when the Ti content is assumed to be 100 parts by mole, the AM content is controlled to be 2.0 parts by mole or more and 10 parts by mole or less, the Bi content is controlled to be 1.8 parts by mole or more and 10 parts by mole or less, the Ln content is controlled to be 0.1 parts by mole or more and 1.0 part by mole or less, and the A site/B site ratio is controlled to be 1.000 or more and 1.008 or less. Thereby, a high Curie temperature can be maintained, the electrical resistivity at room temperature can be decreased to a predetermined value or less, a desired rate of change in resistance can be obtained, and a highly reliable sintered product can be obtained. As the reducing atmosphere, a nitrogen atmosphere in which the residual oxygen concentration is in the range of 10 to 1,000 ppm is preferable.

EXAMPLES

As described below, samples of barium titanate-based semiconductor ceramic compositions having various types of compositions were prepared as Examples of the present invention.

Example 1

First, as raw materials of samples of barium titanate-based semiconductor ceramic compositions, powders of $BaCO_3$, $TiO_2$, $Na_2CO_3$ (Sample Nos. 1 to 36, 38, and 39), $K_2CO_3$ (Sample No. 37), and $Bi_2O_3$; and powders of $La_2O_3$ (Sample Nos. 1 to 37), $Nd_2O_3$ (Sample No. 38), and $Sm_2O_3$ (Sample No. 39) which are semiconductor-forming agents were prepared, weighed, and blended so that the compositions after firing were those shown in Sample Nos. 1 to 39 of Table 1. Next, as an organic solvent, ethanol was added to each of the blended powders, and each of the resulting mixtures was mixed and ground together with zirconia balls for 16 hours. Subsequently, the blend was dried, and each of the resulting mixtures was granulated. Each of the granulated powders was heat-treated at a temperature in the range of 800° C. to 1,100° C. for two hours, thereby preparing calcined powders. Vinyl acetate functioning as an organic binder, ammonium polycarboxylate functioning as a dispersant, water, and silica ($SiO_2$) were added to each of the calcined powders, and each of the resulting mixtures was mixed and ground together with zirconia balls for 16 hours. The slurry obtained after grinding was dried and granulated. A uniaxial pressing process was performed using each of the granulated powders as a raw material for pressing to prepare plate-shaped compacts.

The compacts were degreased in air, and then fired while maintaining the sintering temperature in the range of 1,100° C. to 1,250° C. for two hours. The composition of each of the barium titanate-based semiconductor ceramic composition samples thus prepared was analyzed. The composition analysis of the samples was performed by inductively coupled plasma spectroscopy (ICP). Table 1 shows, as the composition of each of the samples, contents (in parts by mole) of Ba, Na, K, Bi, La, Nd, and Sm elements when the content of Ti is assumed to be 100 parts by mole, and the ratio (AM/(Bi+Ln)) of the content of AM to the total content of Bi and a rare earth element when each of the barium titanate-based semiconductor ceramic compositions is represented by a composition formula of $ABO_3$ (wherein A contains Ba, AM (an alkali metal of Na or K), Bi, and Ln (a rare earth element of La, Nd, or Sm), and B contains Ti).

Both side faces of each of the prepared barium titanate-based semiconductor ceramic composition samples were polished with sandpaper, and a heat treatment was then performed at a temperature in the range of 600° C. to 800° C. Subsequently, plating layers made of nickel (Ni), a nickel (Ni)-copper (Cu) alloy, and silver (Ag) were formed on each of the side faces of the samples from the surface side thereof in that order by a dry plating method.

The electrical resistivity at room temperature and the rate of change in resistance were evaluated for the PTC element samples prepared as described above. For each of the samples, the electrical resistivity at room temperature (25° C.) was measured by applying a voltage of 1 V by a direct-current four-probe method. In addition, the rate of change in resistance (the number of digits (the ratio of the maximum value of the measured electrical resistivity to the minimum value thereof: log(maximum value/minimum value)) and the Curie temperature Tc (defined as the temperature at which the electrical resistivity becomes double the electrical resistivity at room temperature) were calculated from the measured electrical resistivity. The rate of change in resistance and the Curie temperature Tc are shown in Table 1 together with the electrical resistivity.

Note that, in Table 1, sample numbers marked with * show comparative examples and not the present invention. In addition, electrical resistivity values of 100 Ω·cm or more at room temperature and the circled values of the number of digits of the rate of change in resistance of less than 3.0 are undesirable ranges in Table 1.

TABLE 1

| | | Composition [parts by mole] (Relative to 100 parts by mole of Ti) | | | | | | Charactistics | | |
|---|---|---|---|---|---|---|---|---|---|---|
| Sample No. | Ti (parts by mole) | Ba | AM (Na) | Bi | Rare earth element (La) | A/B ratio | AM/ (Bi + Ln) | Electrical resistivity [Ω·cm] | Rate of change in resistance [number of digits] | Tc [° C.] |
| *1 | 100 | 90.0 | 4.9 | 4.9 | 0.2 | 1.000 | 0.96 | 42 | 2.1 | 186 |
| *2 | 100 | 90.0 | 5.0 | 4.9 | 0.2 | 1.001 | 0.98 | 45 | 2.0 | 180 |
| 3 | 100 | 90.0 | 5.1 | 4.9 | 0.2 | 1.002 | 1.00 | 55 | 4.8 | 174 |
| 4 | 100 | 90.0 | 5.2 | 4.9 | 0.2 | 1.003 | 1.02 | 54 | 5.1 | 170 |
| 5 | 100 | 90.0 | 5.3 | 4.9 | 0.2 | 1.004 | 1.04 | 59 | 5.0 | 171 |
| 6 | 100 | 90.0 | 5.4 | 4.9 | 0.2 | 1.005 | 1.06 | 67 | 5.4 | 165 |
| *7 | 100 | 90.0 | 5.5 | 4.9 | 0.2 | 1.006 | 1.08 | 123 | 4.7 | 164 |
| *8 | 100 | 90.0 | 5.6 | 4.9 | 0.2 | 1.007 | 1.10 | 247 | 4.0 | 159 |
| *9 | 100 | 90.0 | 5.2 | 4.6 | 0.2 | 1.000 | 1.08 | 193 | 4.3 | 161 |
| 10 | 100 | 90.0 | 5.2 | 4.7 | 0.2 | 1.001 | 1.06 | 84 | 4.6 | 171 |
| 11 | 100 | 90.0 | 5.2 | 4.8 | 0.2 | 1.002 | 1.04 | 64 | 5.2 | 176 |
| 12 | 100 | 90.0 | 5.2 | 4.9 | 0.2 | 1.003 | 1.02 | 55 | 4.6 | 176 |
| 13 | 100 | 90.0 | 5.2 | 5.0 | 0.2 | 1.004 | 1.00 | 68 | 4.0 | 174 |
| *14 | 100 | 90.0 | 5.2 | 5.1 | 0.2 | 1.005 | 0.98 | 39 | 2.8 | 181 |
| 15 | 100 | 90.0 | 5.2 | 4.9 | 0.01 | 1.001 | 1.06 | 93 | 4.1 | 177 |
| 16 | 100 | 90.0 | 5.2 | 4.9 | 0.05 | 1.002 | 1.05 | 89 | 4.4 | 175 |
| 17 | 100 | 90.0 | 5.2 | 4.9 | 0.1 | 1.002 | 1.04 | 87 | 4.6 | 176 |
| 18 | 100 | 90.0 | 5.2 | 4.9 | 0.15 | 1.003 | 1.03 | 64 | 4.1 | 177 |
| 19 | 100 | 90.0 | 5.2 | 4.9 | 0.2 | 1.003 | 1.02 | 52 | 5.1 | 170 |
| 20 | 100 | 90.0 | 5.2 | 4.9 | 0.3 | 1.004 | 1.00 | 64 | 3.7 | 165 |
| *21 | 100 | 90.0 | 5.2 | 4.9 | 0.4 | 1.005 | 0.98 | 47 | 2.4 | 163 |
| 22 | 100 | 90.0 | 5.2 | 4.5 | 0.4 | 1.001 | 1.06 | 78 | 4.3 | 160 |
| 23 | 100 | 90.0 | 5.2 | 4.5 | 0.6 | 1.003 | 1.02 | 54 | 3.7 | 154 |
| *24 | 100 | 90.0 | 5.2 | 4.5 | 1.0 | 1.007 | 0.95 | 36 | 1.9 | 141 |
| 25 | 100 | 90.0 | 5.2 | 4.0 | 1.0 | 1.002 | 1.04 | 51 | 3.4 | 135 |
| 26 | 100 | 96.0 | 2.1 | 1.8 | 0.2 | 1.001 | 1.05 | 67 | 4.1 | 131 |
| 27 | 100 | 94.0 | 3.2 | 2.9 | 0.2 | 1.003 | 1.03 | 79 | 5.3 | 144 |
| 28 | 100 | 92.0 | 4.2 | 3.9 | 0.2 | 1.003 | 1.02 | 84 | 5.8 | 160 |
| 29 | 100 | 90.0 | 5.1 | 4.8 | 0.2 | 1.001 | 1.02 | 87 | 5.5 | 176 |
| 30 | 100 | 88.0 | 6.1 | 5.9 | 0.2 | 1.002 | 1.00 | 86 | 5.0 | 191 |
| 31 | 100 | 85.0 | 7.6 | 7.3 | 0.2 | 1.001 | 1.01 | 85 | 3.4 | 201 |
| 32 | 100 | 80.0 | 10.0 | 9.8 | 0.2 | 1.000 | 1.00 | 90 | 5.6 | 210 |
| 33 | 100 | 90.0 | 5.1 | 4.7 | 0.2 | 1.000 | 1.04 | 77 | 4.8 | 174 |
| 34 | 100 | 90.4 | 5.1 | 4.7 | 0.2 | 1.004 | 1.04 | 89 | 5.6 | 175 |
| 35 | 100 | 90.6 | 5.1 | 4.7 | 0.2 | 1.006 | 1.04 | 87 | 4.7 | 174 |
| 36 | 100 | 90.8 | 5.1 | 4.7 | 0.2 | 1.008 | 1.04 | 80 | 5.2 | 179 |
| 37 | 101 | 90 | (K) 5.2 | 4.9 | 0.2 | 1.003 | 1.02 | 68 | 5.6 | 167 |
| 38 | 102 | 90 | 5.2 | 4.9 | (Nd) 0.2 | 1.003 | 1.02 | 57 | 4.8 | 173 |
| 39 | 103 | 90 | 5.2 | 4.9 | (Sm) 0.2 | 1.003 | 1.02 | 59 | 4.7 | 174 |

As understood from the results shown in Table 1, Sample Nos. 3 to 6, 10 to 13, 15 to 20, 22, 23, and 25 to 39, in which the ratio AM/(Bi+Ln) is 1.00 or more and 1.06 or less, and the barium titanate-based semiconductor ceramic compositions having low electrical resistivity values at room temperature are obtained, and barium titanate-based semiconductor ceramic compositions having high Curie temperatures and desired rates of change in resistance can be produced with good reproducibility. A ratio AM/(Bi+Ln) of less than 1.00 is not preferable because the thickness of a depletion layer near crystal grain boundaries is decreased, thereby decreasing the rate of change in resistance. In the case where the ratio AM/(Bi+Ln) is more than 1.06, the ratio of presence of AM is increased not only at crystal grain boundaries but also in crystal grains, thereby increasing the electrical resistivity.

In addition, it is found that by controlling the AM content to be 2.0 parts by mole or more and 10 parts by mole or less, the Bi content to be 1.8 parts by mole or more and 10 parts by mole or less, and the Ln content to be 0.1 parts by mole or more and 1.0 part by mole or less, and controlling the A site/B site ratio to be 1.002 or more and 1.008 or less, a high Curie temperature can be maintained, the electrical resistivity at room temperature can be decreased to a predetermined value or less, and a desired rate of change in resistance can be obtained.

Example 2

First, as raw materials of samples of barium titanate-based semiconductor ceramic compositions, powders of $BaCO_3$, $TiO_2$, $Na_2CO_3$, and $Bi_2O_3$, and a powder of $La_2O_3$ (which is a semiconductor-forming agent) were prepared. These raw materials were weighed and blended so that the compositions after firing were those shown in Sample Nos. 40 to 72 of Table 2. Next, as an organic solvent, ethanol was added to each of the blended powders, and each of the resulting mixtures was mixed and ground together with zirconia balls for 16 hours. Subsequently, the solvent was dried, and each of the resulting mixtures was granulated. Each of the granulated powders was heat-treated at a temperature in the range of 800° C. to 1,100° C. for two hours, thereby preparing calcined powders. Vinyl acetate functioning as an organic binder, ammonium polycarboxylate functioning as a dispersant, water, and silica ($SiO_2$) were added to each of the calcined powders, and each of the resulting mixtures was mixed and ground together with zirconia balls for 16 hours. A slurry obtained after grinding was dried and granulated. A uniaxial pressing process was performed using each of the granulated powders as a raw material for pressing to prepare plate-shaped compacts.

The compacts were degreased, and then fired in a reducing (nitrogen) atmosphere in which the residual oxygen concentration was in the range of 100 to 200 ppm while maintaining a sintering temperature in the range of 1,300° C. to 1,400° C. for two hours. The composition of each of the barium titanate-based semiconductor ceramic composition samples thus prepared was analyzed. The composition analysis of the samples was performed by inductively coupled plasma spectroscopy (ICP). Table 2 shows, as the composition of each of the samples, contents (parts by mole) of elements of Ba, Na, Bi, and La when the content of Ti is assumed to be 100 parts by mole, and the ratio (AM/(Bi+Ln)) of the content of AM to the total content of Bi and a rare earth element when each of the barium titanate-based semiconductor ceramic compositions is represented by a composition formula of $ABO_3$ (wherein A contains Ba, AM (an alkali metal Na), Bi, and Ln (a rare earth element La), and B contains Ti).

Both side faces of each of the prepared barium titanate-based semiconductor ceramic composition samples were polished with sandpaper, and a heat treatment was then performed at a temperature in the range of 600° C. to 800° C. Subsequently, plating layers made of nickel (Ni), a nickel (Ni)-copper (Cu) alloy, and silver (Ag) were formed on each of the side faces of the samples from the surface side thereof in that order by a dry plating method.

The electrical resistivity at room temperature and the rate of change in resistance were evaluated for the PTC element samples prepared as described above. For each of the samples, the electrical resistivity at room temperature (25° C.) was measured by applying a voltage of 1 V by a direct-current four-probe method. In addition, the rate of change in resistance (the number of digits (the ratio of the maximum value of the measured electrical resistivity to the minimum value thereof: log(maximum value/minimum value)) and the Curie temperature Tc (defined as a temperature at which the electrical resistivity becomes double the electrical resistivity at room temperature) were calculated from the measured electrical resistivity. The rate of change in resistance and the Curie temperature Tc are shown in Table 2 together with the electrical resistivity.

Note that, in Table 2, sample numbers marked with * are comparative examples outside the scope of the present invention. In addition, electrical resistivity values of 100 Ω·cm or more at room temperature and the circled values of the number of digits of the rate of change in resistance of less than 3.0 are undesirable ranges in Table 2.

TABLE 2

| Sample No. | Ti (parts by mole) | Composition [parts by mole] (Relative to 100 parts by mole of Ti) | | | | A/B ratio | AM/ (Bi + Ln) | Charactistics | | |
|---|---|---|---|---|---|---|---|---|---|---|
| | | Ba | AM (Na) | Bi | Rare earth element (La) | | | Electrical resistivity [Ω · cm] | Rate of change in resistance [number of digits] | Tc [° C.] |
| *40 | 100 | 90.0 | 4.5 | 4.5 | 0.2 | 0.992 | 0.96 | 27 | 2.4 | 184 |
| *41 | 100 | 90.0 | 4.6 | 4.5 | 0.2 | 0.993 | 0.98 | 34 | 2.3 | 180 |
| 42 | 100 | 90.0 | 4.7 | 4.5 | 0.2 | 0.994 | 1.00 | 51 | 3.8 | 181 |
| 43 | 100 | 90.0 | 4.8 | 4.5 | 0.2 | 0.995 | 1.02 | 84 | 3.7 | 179 |
| 44 | 100 | 90.0 | 4.9 | 4.5 | 0.2 | 0.996 | 1.04 | 66 | 4.0 | 177 |
| 45 | 100 | 90.0 | 5.0 | 4.5 | 0.2 | 0.997 | 1.06 | 79 | 4.5 | 172 |
| *46 | 100 | 90.0 | 5.1 | 4.5 | 0.2 | 0.998 | 1.09 | 172 | 4.2 | 176 |
| *47 | 100 | 90.0 | 5.3 | 4.5 | 0.2 | 1.000 | 1.13 | 215 | 3.8 | 177 |
| *48 | 100 | 90.0 | 5.0 | 4.3 | 0.2 | 0.995 | 1.11 | 160 | 3.7 | 171 |
| *49 | 100 | 90.0 | 5.0 | 4.4 | 0.2 | 0.996 | 1.09 | 134 | 3.7 | 177 |
| 50 | 100 | 90.0 | 5.0 | 4.6 | 0.2 | 0.998 | 1.04 | 54 | 4.0 | 175 |
| 51 | 100 | 90.0 | 5.0 | 4.7 | 0.2 | 0.999 | 1.02 | 61 | 4.1 | 176 |
| 52 | 100 | 90.0 | 5.0 | 4.8 | 0.2 | 1.000 | 1.00 | 30 | 3.7 | 174 |
| *53 | 100 | 90.0 | 5.0 | 4.9 | 0.2 | 1.001 | 0.98 | 27 | 2.1 | 181 |
| 54 | 100 | 90.0 | 5.0 | 4.7 | 0.001 | 0.997 | 1.06 | 88 | 4.6 | 180 |
| 55 | 100 | 90.0 | 5.0 | 4.7 | 0.01 | 0.997 | 1.06 | 81 | 4.0 | 181 |
| *56 | 100 | 90.0 | 5.0 | 4.7 | 0.4 | 1.001 | 0.98 | 54 | 2.7 | 171 |
| 57 | 100 | 90.0 | 5.0 | 4.3 | 0.4 | 0.997 | 1.06 | 63 | 3.9 | 166 |
| *58 | 100 | 90.0 | 5.0 | 4.3 | 1.0 | 1.003 | 0.94 | 32 | 2.2 | 148 |
| 59 | 100 | 90.0 | 5.0 | 3.8 | 1.0 | 0.998 | 1.04 | 84 | 3.7 | 150 |
| 60 | 100 | 96.0 | 2.0 | 1.8 | 0.2 | 1.000 | 1.00 | 45 | 4.1 | 133 |
| 61 | 100 | 94.0 | 3.1 | 2.8 | 0.2 | 1.001 | 1.03 | 54 | 5.3 | 151 |
| 62 | 100 | 92.0 | 4.1 | 3.9 | 0.2 | 1.002 | 1.00 | 55 | 3.7 | 160 |
| 63 | 100 | 90.0 | 5.0 | 4.7 | 0.2 | 0.999 | 1.02 | 80 | 4.5 | 172 |
| 64 | 100 | 88.0 | 6.0 | 5.7 | 0.2 | 0.999 | 1.02 | 81 | 4.2 | 182 |
| 65 | 100 | 85.0 | 7.4 | 7.0 | 0.2 | 0.996 | 1.03 | 89 | 4.7 | 187 |
| 66 | 100 | 80.0 | 9.9 | 9.6 | 0.2 | 0.997 | 1.01 | 87 | 4.5 | 202 |
| 67 | 100 | 85.0 | 4.9 | 4.5 | 0.2 | 0.946 | 1.04 | 89 | 4.1 | 174 |
| 68 | 100 | 87.0 | 4.9 | 4.5 | 0.2 | 0.966 | 1.04 | 86 | 4.8 | 177 |
| 69 | 100 | 90.0 | 4.9 | 4.5 | 0.2 | 0.996 | 1.04 | 84 | 4.6 | 173 |
| 70 | 100 | 90.2 | 4.9 | 4.5 | 0.2 | 0.998 | 1.04 | 65 | 4.4 | 173 |
| 71 | 100 | 90.4 | 4.9 | 4.5 | 0.2 | 1.000 | 1.04 | 69 | 4.1 | 179 |
| 72 | 100 | 90.6 | 4.9 | 4.5 | 0.2 | 1.002 | 1.04 | 70 | 4.4 | 178 |

As understood from the results shown in Table 2, Sample Nos. 42 to 45, 50 to 52, 54, 55, 57, and 59 to 72, in which the ratio AM/(Bi+Ln) is 1.00 or more and 1.06 or less, are barium titanate-based semiconductor ceramic compositions having low electrical resistivity values at room temperature, and barium titanate-based semiconductor ceramic compositions having high Curie temperatures and desired rates of change in resistance can be produced with good reproducibility. A ratio AM/(Bi+Ln) of less than 1.00 is not preferable because the thickness of a depletion layer near crystal grain boundaries is decreased, thereby decreasing the rate of change in resistance. In the case where the ratio AM/(Bi+Ln) is more than 1.06, the ratio of presence of AM is increased not only at crystal grain boundaries but also in crystal grains, thereby increasing the electrical resistivity. Furthermore, a reliability test was performed as follows. For each sample number, five samples were prepared. The resistance of each of the samples was measured before and after the sample was maintained at 150° C. for 1,000 hours to calculate a rate of change with time. According to the results, the average rate of change with time was within ±30%.

It is found that when the Ti content is assumed to be 100 parts by mole, by controlling the AM content to be 2.0 parts by mole or more and 10 parts by mole or less, the Bi content to be 1.8 parts by mole or more and 10 parts by mole or less, and the Ln content to be 0.1 parts by mole or more and 1.0 part by mole or less, and controlling the A site/B site ratio to be 1.000 or more and 1.008 or less, a high Curie temperature can be maintained, the electrical resistivity at room temperature can be decreased to a predetermined value or less, a desired rate of change in resistance can be obtained, and a highly reliable sintered product can be obtained.

Example 3

First, samples of barium titanate-based semiconductor ceramic compositions were prepared by the same method as that used in Example 1 except that, as raw materials of the samples of the barium titanate-based semiconductor ceramic compositions, powders of $BaCO_3$, $TiO_2$, $Na_2CO_3$, and $Bi_2O_3$, and a powder of $La_2O_3$ (which is a semiconductor-forming agent) were weighed and blended so that the composition after firing was $(Ba_{0.900}Na_{0.052}Bi_{0.049}La_{0.002})TiO_3$. The amount of presence of Na at grain boundaries was changed by controlling the sintering holding time and the sintering atmosphere for preparing the samples.

An end face of a thermistor body formed using each of the barium titanate-based semiconductor ceramic composition samples thus prepared was polished, and then processed by milling with Ar ions. The composition of a small area of each of the prepared samples was analyzed by transmission electron microscopy-energy dispersive X-ray spectroscopy (TEM-EDX). In the composition analysis, the contents of Na and Bi present at crystal grain boundaries and in crystal grains were determined in terms of molar quantity by converting from peak areas of the sodium element and the bismuth element, respectively, present at the crystal grain boundaries and in the crystal grains. The Na/Bi ratios of the Na content to the Bi content at the crystal grain boundaries and in the crystal grains were calculated from the determined contents of Na and Bi. Table 3 shows the results of the composition analysis thus obtained. In addition, for each of PTC element samples prepared as in Example 1, the electrical resistivity at room temperature was measured by the same method as that used in Example 1, and the rate of change in resistance was calculated from the measured electrical resistivity to evaluate the samples. The results of this evaluation are also shown in Table 3.

resistivity can be obtained, a barium titanate-based semiconductor ceramic composition and a PTC element that have a high Curie temperature, a low electrical resistivity at room temperature, and a desired rate of change in resistance can be produced with good reproducibility. The present invention can be applied to a barium titanate-based semiconductor ceramic composition used in a PTC element such as a PTC thermistor for overcurrent protection or a PTC heater functioning as a self-temperature control heater.

The invention claimed is:

1. A barium titanate-based semiconductor ceramic composition having a perovskite structure described as containing $ABO_3$ at least barium and titanium,
   wherein the A site of the perovskite comprises barium, at least one alkali metal element, bismuth, and a rare earth element, the B site of the perovskite comprises titanium and
   when the content of the titanium is assumed to be 100 parts by mole, a ratio of the content of the alkali metal element to the sum of the content of the bismuth plus the content of the rare earth element represented by parts by mole, is from 1.00 to 1.06.

2. The barium titanate-based semiconductor ceramic composition according to claim 1, wherein the alkali metal element comprises sodium.

TABLE 3

| Sample No. | Grain boundary Na | Grain boundary Bi | In grain Na | In grain Bi | Na/Bi (Grain boundary) | Na/Bi (In grain) | Charactistics Electrical resistivity [Ω·cm] | Charactistics Rate of change in resistance [number of digits] |
|---|---|---|---|---|---|---|---|---|
| 301 | 5.0 | 4.9 | 5.0 | 4.9 | 1.02 | 1.02 | 34 | 3.4 |
| 302 | 5.1 | 4.9 | 5.1 | 4.9 | 1.04 | 1.04 | 42 | 4.3 |
| 303 | 5.3 | 2.5 | 5.1 | 4.9 | 2.12 | 1.04 | 37 | 4.8 |
| 304 | 6.4 | 1.7 | 5.0 | 4.8 | 3.76 | 1.04 | 46 | 5.0 |
| 305 | 8.4 | 1.7 | 5.1 | 4.8 | 4.94 | 1.06 | 42 | 5.1 |
| 306 | 10.1 | 1.9 | 5.0 | 4.7 | 5.32 | 1.06 | 54 | 5.1 |

The results shown in Table 3 show that Sample Nos. 302 to 305, in which the ratio Na/Bi of the Na content to the Bi content at crystal grain boundaries is 1.04 or more and 5.0 or less, the electrical resistivity is 50 Ω·cm or less, the number of digits of the rate of change in resistance is 4 or more, and thus excellent characteristics are obtained. Furthermore, it is also found that, in the above cases, the ratio Na/Bi of the Na content to the Bi content at crystal grain boundaries is higher than the ratio Na/Bi of the Na content to the Bi content in crystal grains. It is believed that segregation of Na and Bi that are present not in crystal grains but at crystal grain boundaries and triple points has some kind of effect on the rate of change in resistance of the barium titanate-based semiconductor ceramic compositions of the present invention.

It should be considered that the embodiment and the Examples disclosed herein are exemplifications in all the points and are not restrictive. It is intended that the scope of the present invention should be defined not by the embodiment and the Examples but by the appended claims and include meanings equivalent to the scope of the claims and all amendments and modifications within the scope thereof.

INDUSTRIAL APPLICABILITY

According to the present invention, a barium titanate-based semiconductor ceramic composition having a low electrical 3. The barium titanate-based semiconductor ceramic composition according to claim 2, wherein the alkali metal is a combination of sodium and lithium.

4. The barium titanate-based semiconductor ceramic composition according to claim 2, wherein the rare earth metal comprises La.

5. The barium titanate-based semiconductor ceramic composition according to claim 2, wherein relative to a Ti content of 100 parts by mole, the content of the alkali metal is 2 to 10 parts by mole, the content of Bi is 1.8 to 10 parts by mole and the content of rare earth element is 0.001 to 1 part by mole; and molar ratio of the A site to the B site is 0.946 to 1.008.

6. The barium titanate-based semiconductor ceramic composition according to claim 5, wherein a ratio of the content of the alkali metal element present in crystal grain boundaries of the barium titanate-based semiconductor ceramic composition to the content of the bismuth present in crystal grain boundaries of the barium titanate-based semiconductor ceramic composition in parts by mole is from 1.04 to 5.0.

7. The barium titanate-based semiconductor ceramic composition according to claim 6, wherein the ratio of the crystal grain boundary content of the alkali metal element to the crystal grain boundary content of the bismuth in parts by mole is from 1.04 to 1.06.

8. The barium titanate-based semiconductor ceramic composition according to claim 7, wherein relative to a Ti content of 100 parts by mole, the content of the alkali metal is 2.1 to 7.6 parts by mole, the content of Bi is 2.8 to 9.8 parts by mole, and the content of rare earth element is 0.1 to 1 part by mole; the molar ratio of the content of the alkali metal element to the sum of the content of the bismuth plus the content of the rare earth element is from 1.01 to 1.04; and molar ratio of the A site to the B site is 1.002 to 1.008.

9. The barium titanate-based semiconductor ceramic composition according to claim 2, wherein relative to a Ti content of 100 parts by mole, the content of the alkali metal is 2.1 to 7.6 parts by mole, the content of Bi is 2.8 to 9.8 parts by mole, and the content of rare earth element is 0.1 to 1 part by mole; the molar ratio of the content of the alkali metal element to the sum of the content of the bismuth plus the content of the rare earth element is from 1.01 to 1.04; and molar ratio of the A site to the B site is 1.002 to 1.008.

10. The barium titanate-based semiconductor ceramic composition according to claim 1, wherein a ratio of the content of the alkali metal element present in crystal grain boundaries of the barium titanate-based semiconductor ceramic composition to the content of the bismuth present in crystal grain boundaries of the barium titanate-based semiconductor ceramic composition in parts by mole is from 1.04 to 5.0.

11. The barium titanate-based semiconductor ceramic composition according to claim 10, wherein the ratio of the crystal grain boundary content of the alkali metal element to the crystal grain boundary content of the bismuth in parts by mole is from 1.04 to 1.06.

12. The barium titanate-based semiconductor ceramic composition according to claim 1, wherein relative to a Ti content of 100 parts by mole, the content of the alkali metal is 2 to 10 parts by mole, the content of Bi is 1.8 to 10 parts by mole and the content of rare earth element is 0.1 to 1 part by mole; and molar ratio of the A site to the B site is 0.946 to 1.008.

13. The barium titanate-based semiconductor ceramic composition according to claim 12, wherein relative to a Ti content of 100 parts by mole, the content of the alkali metal is 2.1 to 7.6 parts by mole, the content of Bi is 2.8 to 9.8 parts by mole, and the content of rare earth element is 0.1 to 1 part by mole; the molar ratio of the content of the alkali metal element to the sum of the content of the bismuth plus the content of the rare earth element is from 1.01 to 1.04; and molar ratio of the A site to the B site is 1.002 to 1.008.

14. A PTC element comprising:
a ceramic body composed of the barium titanate-based semiconductor ceramic composition according to claim 13; and
an electrode disposed on a surface of the ceramic body.

15. A PTC element comprising:
a ceramic body composed of the barium titanate-based semiconductor ceramic composition according to claim 12; and
an electrode disposed on a surface of the ceramic body.

16. A PTC element comprising:
a ceramic body composed of the barium titanate-based semiconductor ceramic composition according to claim 11; and
an electrode disposed on a surface of the ceramic body.

17. A PTC element comprising:
a ceramic body composed of the barium titanate-based semiconductor ceramic composition according to claim 10; and
an electrode disposed on a surface of the ceramic body.

18. A PTC element comprising:
a ceramic body composed of the barium titanate-based semiconductor ceramic composition according to claim 6; and
an electrode disposed on a surface of the ceramic body.

19. A PTC element comprising:
a ceramic body composed of the barium titanate-based semiconductor ceramic composition according to claim 2; and
an electrode disposed on a surface of the ceramic body.

20. A PTC element comprising:
a ceramic body composed of the barium titanate-based semiconductor ceramic composition according to claim 1; and
an electrode disposed on a surface of the ceramic body.

* * * * *